United States Patent [19]

Feldmann et al.

[11] Patent Number: 4,487,895

[45] Date of Patent: Dec. 11, 1984

[54] POWDERED MIXTURE OF POLYAMIDES FOR HEAT SEALING BY THE POWDER POINT PROCESS

[75] Inventors: Rainer Feldmann, Marl; Heinz Scholten, Haltern, both of Fed. Rep. of Germany

[73] Assignee: Chemische Werke Hüls AG, Marl, Fed. Rep. of Germany

[21] Appl. No.: 615,687

[22] Filed: Jun. 1, 1984

Related U.S. Application Data

[60] Continuation-in-part of Ser. No. 388,427, Jun. 14, 1982, abandoned, which is a division of Ser. No. 145,377, Apr. 30, 1980, abandoned.

[30] Foreign Application Priority Data

May 19, 1979 [DE] Fed. Rep. of Germany ....... 2920416

[51] Int. Cl.$^3$ .................... C08L 77/02; B32B 27/34; D04H 27/36
[52] U.S. Cl. .................... 525/432; 427/180; 428/261; 428/206; 428/287; 525/934
[58] Field of Search ......................................... 525/432

[56] References Cited

U.S. PATENT DOCUMENTS

| | | | |
|---|---|---|---|
| 3,536,780 | 10/1970 | Schaaf et al. | 260/857 |
| 3,950,297 | 4/1976 | Raabe et al. | 524/602 |
| 4,139,613 | 2/1979 | Hefele | 427/197 |
| 4,196,108 | 4/1980 | Hinze et al. | 525/432 |

*Primary Examiner*—John C. Bleutge
*Assistant Examiner*—A. L. Carrillo
*Attorney, Agent, or Firm*—Wells & Wells

[57] ABSTRACT

Powdered polyamide mixtures for use in the heat sealing of textiles by the powder point process. The polyamide homogeneous mixtures contain:

(a) about 95 to 40% by weight of at least one copolyamide with a melting point of at least about 110° to 140° C. and having a proportion of a basic lauryllactam monomer component of at least 20% and at most 70% by weight; and (b) about 5 to 60% by weight of at least one copolyamide with a melting point between about 80° to 110° C. and having a proportion of a basic lauryllactam monomer component or lauryllactam and 11-aminoundecanoic acid copolymer of at least 25% and at most 70% by weight, where the percentages are based on the total weight of the copolyamide mixtures.

7 Claims, No Drawings

POWDERED MIXTURE OF POLYAMIDES FOR HEAT SEALING BY THE POWDER POINT PROCESS

This application is a continuation-in-part of application Ser. No. 388,427, filed June 14, 1982, which is a division of application Ser. No. 145,377, filed Apr. 30, 1980 both now abandoned.

CROSS REFERENCE TO RELATED APPLICATIONS

Applicants claim priority under 35 U.S.C. 119 for application P 29 20 416.8, filed May 19, 1979 in the Patent Office of the Federal Republic of Germany.

The disclosure of assignee's copending application Ser. No. 6,874, filed Jan. 26, 1979, now U.S. Pat. No. 4,237,040 is incorporated herein to show copolyamides, terpolyamides and suspension agents used for the polyamides in the spot coating of garment interlinings.

BACKGROUND OF THE INVENTION

The field of the invention is polyamide adhesives for textiles and the invention is particularly concerned with powdered mixtures of polyamides for heat sealing textiles by the powder point process.

The state of the art of methods and apparatus for depositing powdered thermoplastic adhesive materials on the outer surface of textiles may be ascertained by reference to U.S. Pat. Nos. 4,139,613, 4,183,978 and 3,667,422 and British Pat. No. 1,295,558, the disclosures of which are incorporated herein.

Copolyamides useful as adhesives and the state of the art thereof may be ascertained by reference to U.S. Pat. Nos. 2,252,555; 3,515,702; 3,839,121; 3,883,485; 3,883,487; 3,948,844; 3,950,297; 4,035,436; 4,046,747; 4,101,534 and Re. 27,939; British Pat. Nos. 1,458,640 and 1,548,431 and West German Published Application Nos. 24 36 430 and 28 06 933, the disclosures of which are incorporated herein.

The state of the prior art of producing polyamide powders may be ascertained by reference to U.S. Pat. No. 4,143,025 and the Kirk-Othmer "Encyclopedia of Chemical Technology", 2nd ed., vol. 16 (1968) under the section "Polyamide (Plastics)", pages 88–105, particularly page 92-polylauryllactam (nylon-12), and polyundecanamide (nylon-11), page 101, Solution Processes, and Powder Processing, pages 101–102, the disclosures of which are incorporated herein.

According to British Pat. No. 1,295,558, the spot coating of interlinings for textiles is carried out mainly by three methods:

1. A suitable plastic powder, for example, a polyamide or polyethylene based powder, is applied by a doctor blade to an engraving roller having recesses in the form of dots disposed in an even raster or grid formation and having a diameter of about 1 mm so that the plastic powder fills the recesses. The web of the interlining, which has been preheated to a high temperature by means of heating rollers, is passed around the engraving roller under tension and the plastics powder is transferred from the recesses to the web of interlining material (Powder point or powder dot coating process).

2. A network of spots of a suitable plastic, such as polyethylene, is prepared in the form of a raster, the spots being interconnected by very fine webs. The network is applied dry to the hot interlining, the fine webs breaking up and disappearing, and the spots of the plastic fusing to the interlining. Interlinings of this kind have a relatively hard handle and can be fixed only on relatively heavy facing materials and the plastics also tend to bleed through and stick to the fixing press.

3. In the least expensive and least complex process, suitable plastics, such as PVC, polyamide or polyethylene, are mixed with plasticizers or in aqueous or solvent-containing media to form pastes which are printed by means of a printing roller formed with perforations arranged as a raster (paste printing process).

The use of copolyamides as synthetic resin adhesives for laminating fabrics has been known for a long time as disclosed in U.S. Pat. No. 2,252,555 at page 3, Column 2, lines 42–50. Lauryllactam based synthetic resin adhesives have been used especially commercially in recent years for heat sealing textiles as disclosed in U.S. Pat. No. 3,515,702 and U.S. Pat. No. Re. 27,939. These synthetic resin adhesives are not yet fully satisfactory as regards their resistance to hot water and cleaning and as a result of unsatisfactory performance, many variations have been introduced. Thus, U.S. Pat. No. 3,839,121 discloses synthetic resin adhesives based on copolyamides which contain branched chain diamine components with improved resistance to cleaning but bonding at higher temperatures is required. Nonamethylenediamine based copolyamides also exhibit too high a melting point and therefore are not suitable as synthetic resin adhesives for heat sealing textiles as disclosed in British Pat. Nos. 1,458,640 and 1,548,431. Copolyamides with low melting points are unsatisfactory with respect to their hot-water resistance and their fasteness to cleaning, as disclosed in U.S. Pat. Nos. 3,883,485; 3,883,487; 3,948,844 and 3,950,297 and German Published Application Nos. 24 36 430 and 28 06 933. Previously mentioned U.S. Pat. No. 2,252,555 further discloses that copolyamides when mixed with homopolyamides are especially suitable for bonding metal surfaces (loc. cit., Column 1, lines 1–10). The same teaching is found in U.S. Pat. No. 4,101,534, beginning at the top of Column 2.

U.S. Pat. No. 3,035,436 teaches the use of mixtures of crystalline homopolyamides or copolyamides of lauryllactam and of 11-aminoundecanoic acid in specific proportions in a mixture with crystalline homopolyamides or copolyamides of hexamethylenediamine and 1,12-dodecanoicdicarboxylic acid for bonding metals, these mixtures also being suitable for use in powder form. In this case, however, when copolyamides are used, they contain at most 5 or 10% by weight of other copolyamide forming basic components. Accordingly, the use of crystalline homoamides or copolyamides is required.

These mixtures are used especially in the form of films for sealing the corner joints of cans. U.S. Pat. No. 4,035,436 teaches that good bonding of the synthetic resin adhesive for high temperatures and especially for good water resistance is achieved only when the mixtures exhibit high crystallinity. Only then is it possible to operate with melt cooling cycles which are extremely short.

The conditions for bonding textiles using the powder point process are entirely different from the prior art uses of polyamide adhesives. By powder point process or powder dot coating process is meant the process especially described in U.S. Pat. No. 3,667,422 and described as method 1 of British Pat. No. 1,295,558. No short cycle periods are needed in the ironing presses and on the other hand, bonding is desired within a wide temperature range. The adhesive must wet the fabric as thoroughly as possible and must be satisfactorily resistant to hot detergent liquors and chemical cleaning agents. Only very low bonding temperatures are allowed for delicate fabrics. Therefore, a melting range having an upper limit of 135° C. should not be exceeded. These requirements cannot be met when the mixtures described in U.S. Pat. No. 4,035,436 are used.

U.S. Pat. No. 2,698,966 further discloses the use of mixtures of powdered homopolyamides for the manufacture of molded articles, where a molded article is first pressed from the powder mixture and then the pressed article is sintered at a higher temperature.

U.S. Pat. No. 2,698,966 offers no indication of how powdered mixtures of copolyamides can be used for the hot sealing of textiles by the powder point process.

SUMMARY OF THE INVENTION

Having in mind the limitations of the prior art, it is an object of the present invention to prepare copolyamide adhesives for textiles which exhibit both good resistance to washing, i.e., to hot water and to cleaning, and which therefore are not degraded in their bonding both with respect to washing and to chemical cleaning. It is a particular object of the present invention to coat siliconized fabrics using the powder point method and then to bond them subsequently.

The previously known synthetic resin adhesives offer only inadequate bonding, hot-water and cleaning resistance with respect to siliconized fabrics. Now it has been found that the drawbacks of the state of the art can be overcome when powdered homogeneous mixtures of copolyamides are used for the heat sealing of textiles by the powder point method, where the uniform and intimate mixtures comprise:

(a) about 95 to 40% by weight of at least one copolyamide with a melting point of about 110° to 140° C. and a proportion of the basic lauryllactam monomer component of at least 20% and at most 70% by weight; and (b) about 5 to 60% by weight of at least one copolyamide with a melting point of 80° to 110° C. and a proportion of the basic lauryllactam monomer component or lauryllactam and 11-aminoundecanoic acid copolymer of at least 25% and at most 60% by weight, where the percentages are based on the total weight of the copolyamides.

DESCRIPTION OF PREFERRED EMBODIMENTS

The melting point is defined herein by the fusion of a powder in a melting tube in a Mettler Fp 51 apparatus.

Preferably, the proportion of the copolyamides (a) is from 90 to 60% by weight and that of the copolyamides (b) is from 10 to 40% by weight.

The copolyamides (a) contain the basic component lauryllactam monomer, preferably in amounts of at least 25%, especially at least 30% by weight and this basic component is contained in amounts preferably not exceeding 60% by weight.

As regards the copolyamides (b), the basic components comprising lauryllactam monomer or lauryllactam and 11-aminoundecanoic acid copolymer are contained in amounts of at least about 30–65% by weight, preferably 35–60% by weight and at most in amounts of preferably 65% by weight, especially 60% by weight.

It is essential that the copolyamides melt within the stated temperature limit. These temperature limits are, for copolyamides (a) advantageously about 110° and 140° C., preferably between 115° and 135° C., and for copolyamides (b), advantageously about 80° and 110° C., preferably between 85° and 105° C.

The copolyamides used are preferably at least terpolyamides. They are obtained by hydrolytic polymerization. In principle, the copolyamides may also be manufactured by transamidation of homopolyamides. Because this process, however, is economically inappropriate, this manufacturing method is not favored.

All copolyamides are suitable which are in the stated temperature range. This also includes copolyamides containing oligomeric or polymeric fatty acids. These copolyamides, however, are seldom preferred.

The temprature range for the homogeneous mixtures of copolyamides of the present invention is critical. It must be within the range cited above with respect to the mixed components (a) and (b).

The relative viscosities of the present invention, which are an indication of the molecular weight of the copolyamides, are measured in a 0.5% metacresol solution at 25° C. according to German Industrial Standard (DIN) 53,727. For the copolyamides (a), the relative viscosity is between about 1.4 and 1.75, preferably between 1.45 and 1.70, and for copolyamides (b), the relative viscosity is between about 1.30 and 1.60, and preferably between 1.35 and 1.50.

The following are examples of the copolyamides of group (a):

| m.p.° C. | lauryllactam % by weight | caprolactam % by weight | adipic acid/hexamethylenediamine % by weight |
|---|---|---|---|
| 130 | 33⅓ | 33⅓ | 33⅓ |
| 127 | 40 | 40 | 20 |
| 122 | 40 | 30 | 30 |
| 135 | 60 | 25 | 15 azelaic acid/hexamethylenediamine |
| 117 | 40 | 35 | 25 sebacic acid/hexamethylenediamine |
| 116 | 40 | 35 | 25 adipic acid/isophoronediamine/ trimethylhexamethyldiamine |
| 128 | 60 | 16 | 24 dodecanoicdiacid/ isophoronediamine |
| 132 | 60 | 20 | 20 dodecanoicdiacid/ hexamethylenediamine |
| 116 | 40 | 30 | 30 |
| 122 | 50 | 25 | 25 |

Illustrative copolyamides of group (b) are:

| m.p. °C. | lauryllactam % by weight | caprolactam % by weight | adipic acid/hexamethylenediamine % by weight | sebacic acid/hexamethylenediamine % by weight |
|---|---|---|---|---|
| 98 | 35 | 25 | 20 | 20 |
| 95 | 35 | 30 | 15 | 20 |
| 94 | 40 | 30 | 15 | 15 |

| m.p. °C. | lauryllactam % by weight | caprolactam % by weight | adipic acid/hexa-methylenediamine % by weight | sebacic acid/hexa-methylenediamine % by weight |
|---|---|---|---|---|
| | | | | azelaic acid/hexa-methylenediamine |
| 97 | 30 | 30 | 10 | 30 |
| 90 | 40 | 30 | 15 | 15 |
| | | | | dodecanoicdiacid/hexamethylenediamine |
| 100 | 40 | 30 | 15 | 15 |
| | | | aminoundecanoic acid | azelaic acid/hexa-methylenediamine |
| 88 | 25 | 25 | 25 | 25 |
| 93 | 30 | 30 | 20 | 20 |
| | | | | sebacic acid/hexa-methylenediamine |
| 89 | 25 | 30 | 25 | 20 |
| 90 | 25 | 25 | 25 | 25 |
| | | | | dodecanoicdiacid/hexa-methylenediamine |
| 102 | 30 | 35 | 20 | 15 |
| 93 | 25 | 25 | 25 | 25 |
| | 20 | 30 | 20 | 30 |
| | | | | adipic acid/hexa-methylenediamine |
| 93 | 30 | 30 | 20 | 20 |
| 98 | 25 | 25 | 25 | 25 |

The manufacture of the powdered mixtures can be implemented by cold grinding the mixtures of granulates and by subsequent grading, as disclosed in U.S. Pat. No. 4,143,025. It is, however, more advantageous to mix powders already ground and to prevent clumping by using aggregates of mixtures which function without shearing and heating.

The grain size distribution of the powders is within the conventional range of the powder point process, namely from about 60 to 200 microns, preferably between 80 and 200 microns.

When desired, conventional additives are placed into the powdered mixtures, for instance metallic soaps such as Ca stearate, Zn stearate, optical brighteners or possibly stabilizers such as sterically inhibited phenols.

The powders and mixtures of powders listed in the table below and with a grain size distribution between 60 and 200 microns were subjected to testing. They were deposited with a coating weight of 18±2 g/m² on a commercial base material comprising 100% cotton; material comprising other textile fibers may be used by means of a powder point machine manufactured and designated Saladin-machine according (U.S. Pat. No. 3,667,422) with a 17 mesh engraving roller. Bonding was carried out using an ironing press at 140° C. and a compression of 350 p/cm² and a commercial siliconized upper fabric comprising 55% polyester fibers and 45% wool; a fabric comprising other fibers may be used.

The bonded parts were washed 3 times at 60° C. using a commercial dry cleaner. The resistance to parting was determined by German Industrial Standard (DIN) 54 310, the values being listed in N/5 cm.

The powder point process used in the examples and comparison examples which follow is carried out according to U.S. Pat. No. 3,667,422 as herein before described as method 1 of British Pat. No. 1,295,558.

TABLE

X = isophoronediamine + trimethylhexamethylenediamine in equal amounts by weight

| | Nature and addition of the copolyamides | m.p. °C. | Parting untreated | Strength after washing | After Cleaning |
|---|---|---|---|---|---|
| Comparison Examples | | | | | |
| 1 | A copolyamide 12/6/6,6 wt.-ratio:60/25/15 | 135 | 4 | 2 | 3 |
| 2 | B copolyamide 12/6/X,6 wt.-ratio:60/17/23 | 128 | 6 | 3 | 4 |
| 3 | C copolyamide 12/11/6/6,9 wt.-ratio: 25/25/25/25 | 91 | 7 | 0 | 4 |
| 4 | D copolyamide 12/6/6,12 wt.-ratio: 60/20/20 | 132 | 7 | 3 | 3 |
| 5 | E copolyamide 1 + 2, wt.-ratio: 50/50 | | 5 | 3 | 2 |
| 6 | F copolyamide 4 + 3, wt.-ratio: 25/75 | | 7 | 0 | 5 |
| 7 U.S. Pat. No. 4,035,436 | G copolyamide 11, polyamide 12, polyamide 6,12, wt.-ratios: 60/40/10 | | 0 | 0 | 0 |
| 8 U.S. Pat. No. 4,035,436 | H polyamide 11, polyamide 12, copolyamide 6,12, wt.-ratios: 60/40/10 | | 0 | 0 | 0 |
| Examples | | | | | |
| 1 | D + C copolyamide 4 + 3, wt.-ratio: 50/50 | | 9 | 7 | 10 |
| 2 | D + C copolyamide 4 + 3, wt.-ratio: 75/25 | | 6 | 6 | 9 |
| 3 | D + C copolyamide 4 + 3, wt.-ratio: 85/15 | | 7 | 7 | 9 |
| 4 | A + B + C, copolyamide 1 + 2 + 3, wt.-ratio: 20/40/40 | | 7 | 7 | 7 |
| 5 | A + B + C, copolyamide 1 + 2 + 3, wt.-ratio: 40/40/40 | | 10 | 9 | 10 |

We claim:

1. Powdered polyamide homogeneous mixtures for use in the heat sealing of textiles by the powder point process, consisting esstentially of:
   (a) about 95 to 40% by weight of at least a first copolyamide with a melting point of at least about 110° to 140° C. and having a proportion of a basic lauryllactam monomer component of at least 20% and at most 70% by weight; and
   (b) about 5 to 60% by weight of at least a second copolyamide with a melting point between about 80° to 110° C. and having a proportion of a basic lauryllactam monomer component or lauryllactam and 11-aminoundecanoic acid copolymer of at least 25% and at most 70% by weight, where the percentages are based upon the total weight of the copolyamide mixtures.

2. The powdered polyamide mixtures of claim 1, wherein:
   said first copolyamide (a) is from 90 to 60% by weight; and
   said second copolyamide (b) is from 10 to 40% by weight.

3. The powdered polyamide mixtures of claim 1, wherein:
   said first copolyamide (a) contains at least 25% by weight and at most 60% by weight of the basic lauryllactam monomer component; and
   said second copolyamide (b) contains at least 30% by weight and at most 70% by weight of the basic lauryllactam monomer component or lauryllactam and 11-aminoundecanoic acid copolymer.

4. The powdered mixtures of claim 1, comprising powders having a grain size between about 60 and 200 microns.

5. The powdered mixtures of claim 4, wherein said powders are made by the cold grinding method.

6. The mixtures of claim 1, wherein said first copolyamide has a relative viscosity of about 1.4 to 1.75 and said second copolyamide has a relative viscosity of about 1.30 to 1.60.

7. The mixtures of claim 1, wherein said first copolyamide has a relative viscosity of about 1.45 to 1.70 and said second copolyamide has a relative viscosity of about 1.35 to 1.50.

* * * * *